United States Patent [19]

Trepaud

[11] Patent Number: 4,919,695
[45] Date of Patent: Apr. 24, 1990

[54] APPARATUS FOR DRYING GAS

[76] Inventor: Pierre Trepaud, 17, rue Legendre, 75017 Paris, France

[21] Appl. No.: 342,161

[22] Filed: Apr. 24, 1989

[51] Int. Cl.[5] .............................................. B01D 53/04
[52] U.S. Cl. ........................................ 55/179; 55/189; 55/195; 55/208; 55/387
[58] Field of Search ...................... 55/33, 58, 179, 189, 55/195, 208, 387

[56] References Cited

U.S. PATENT DOCUMENTS

| | | | |
|---|---|---|---|
| 2,273,350 | 2/1942 | Fry et al. | 55/33 X |
| 2,535,902 | 12/1950 | Dailey, Jr. | 55/33 |
| 2,699,837 | 1/1955 | Van Note | 55/179 |
| 2,712,981 | 7/1955 | Beggs | 55/33 |
| 2,747,681 | 5/1956 | Schuftan et al. | 55/33 X |
| 3,696,588 | 10/1972 | Dussourd et al. | 55/189 X |
| 3,834,136 | 9/1974 | Dussourd et al. | 55/189 X |
| 3,934,989 | 1/1976 | Haugen | 55/189 X |
| 4,261,716 | 4/1981 | Schwartz et al. | 55/179 X |
| 4,314,828 | 2/1982 | Saito et al. | 55/179 X |
| 4,436,534 | 3/1984 | Seguy | 55/58 |

FOREIGN PATENT DOCUMENTS

| | | | |
|---|---|---|---|
| 1524313 | 5/1968 | France . | |
| 55-132618 | 10/1980 | Japan | 55/179 |
| 676301 | 7/1979 | U.S.S.R. | 55/179 |
| 751414 | 7/1980 | U.S.S.R. | 55/179 |
| 841658 | 6/1981 | U.S.S.R. | 55/179 |
| 850180 | 7/1981 | U.S.S.R. | 55/179 |
| 1005847 | 3/1983 | U.S.S.R. | 55/179 |
| 1400255 | 7/1975 | United Kingdom . | |
| 2053020 | 2/1981 | United Kingdom . | |

Primary Examiner—Robert Spitzer
Attorney, Agent, or Firm—Pearne, Gordon, McCoy & Granger

[57] ABSTRACT

Apparatus for drying gas comprising two adsorbers mounted in parallel by inlet conduits and exit conduits between an inlet and an exit. A jet pump having a pump inlet, an aspirator and a delivery conduit with a heater is mounted with conduits and non-return check valves for placing only one of the exit conduits selectively in communications with the pump delivery conduit. Non-return check valves are provided for placing the pump inlet in communication only with the other of the exit conduits and a valve is mounted on the aspirator for regulating aspiration of ambient air.

5 Claims, 1 Drawing Sheet

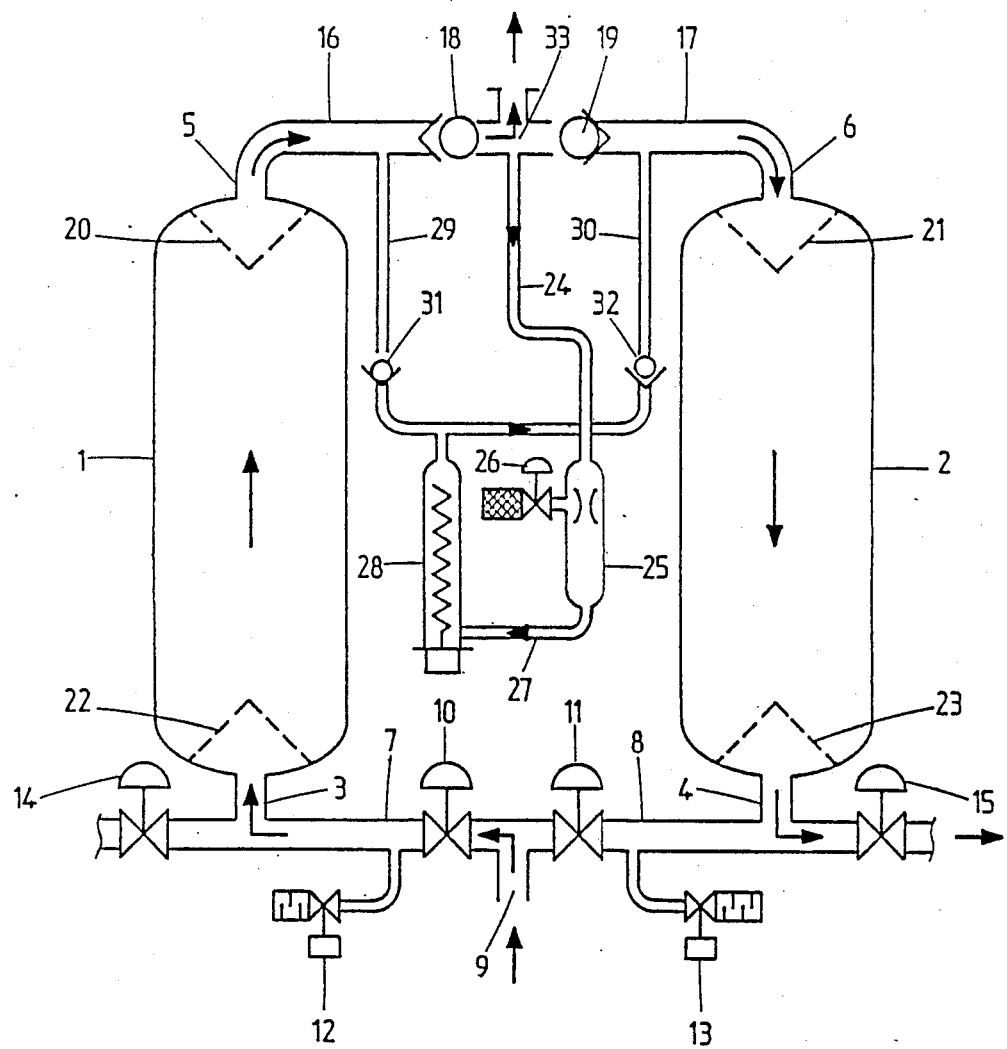

APPARATUS FOR DRYING GAS

This invention concerns apparatus for the drying of gas, notably compressed air.

Ambient air contains water vapour which exists in gaseous form, such that its partial pressure is lower than the saturation pressure, the latter being a function only of temperature. In industrial apparatus, it is often necessary to use air, compressed or not, in which the vapour tension of water is very low. In this case, the air is treated in a drying apparatus or air dryer, which contacts air rich in water vapour with an adsorbant product which has the property of retaining water.

In this case, the adsorbant product, which is for example a gel of silica or alumina, or further active carbon, is arranged in an adsorber through which circulates the air to be dried. As it passes through the interior of the container the air progressively loses the water vapour which it contains as the vapour is immobilised on the adsorbent product without reacting with it chemically.

As the air to be dried traverses the adsorber, the product adsorbs its charge of water and is saturated, initially in the entry zone of the air, and then this zone of saturation gradually extends towards the region of the air exit.

After a certain volume of air has been treated, the adsorbant product must be regenerated, that is to say it must be submitted to treatment to eliminate the water which it has stored. This treatment can be achieved by various procedures and one of these consists of heating the adsorbant product to a temperature such that its adsorptive capacity becomes practically zero, so that the water is eliminated from the adsorbant product. It is thus sufficient to circulate a gaseous fluid as a regeneration current to displace the water which is no longer retained by the adsorbent product.

To operate such a regeneration process in an industrial apparatus which provides compressed air having a predetermined water content per unit volume, it is necessary to provide two identical adsorbers containing an adsorbant product, joined by conduits to the entrance and exit of the apparatus, in such a way as to function alternately to dry the compressed air or to regenerate the adsorbant product, as well as means for heating the adsorbant product.

Adsorption driers currently in use operate two distinct processes for regeneration of the adsorbant product which differ in the gaseous fluid used as the regeneration current for displacement of water from the adsorbant product (cf. Techniques de l'Ingenieur/-Mecanique et Chaleur, B. 4230, 8.1985).

The first of these processes uses as the gaseous regeneration fluid, air withdrawn from the compressed air network at the exit of the adsorber acting as a dryer. The heating means used are in general electrical resistors placed in the adsorber. The withdrawn compressed air is therefore dry air and in consequence it is advantageous withdraw the smallest amount possible.

The second process uses ambient air, as the fluid regeneration gas. The use of ambient air, which is thus humid, to regenerate the drying material is permitted by the fact that at high temperature, the drying material does not adsorb water. However, the dew points thus obtained are not very low. The driers operating this procedure use a fan which propels the ambient air through the adsorber containing the adsorbant product to be regenerated. The heating means used are in general placed downstream of the fan and thus serve equally well for both adsorbers.

Before being able to utilise the regenerated adsorbant product, it is necessary, in both processes, to cool it. For the first process, it is sufficient to turn off the heating means and to maintain a circulation of dry compressed air, always withdrawn from the exit of the drying apparatus; in contrast, for the second process, it is necessary to use dry air only, during the cooling of the adsorbant product, and this is in general withdrawn from the exit of the drying apparatus, in order to avoid introducing humidity into the regenerated adsorbant product. It is equally possible to use a current of ambient air for cooling on the condition that it is made to circulate in the same direction as that followed by the air to be dried in order not to load the exit face of the drying material with water.

The apparatus operating the first of the above processes only allows the use of relatively small withdrawals from the regeneration current if one does not wish to withdraw too great a quantity of dry compressed air from the exit of the apparatus. The process using a fan permits, on the other hand, quite large withdrawals; in contrast it requires much greater energy because it is necessary to raise the whole of the drying material to the maximum temperature.

In FR-B No. 1.524.313, an apparatus is described of the type defined in the preamble of the main claim. There is proposed, apart from one embodiment of little interest using aspiration by a jet pump, an embodiment (FIG. 1) in which a jet pump delivers a mixture of ambient air and compressed air. One can thus transport to the adsorbant to be regenerated, for a given consumption of compressed gas, a gaseous mixture of which the calorific mass is sufficient to transport to the adsorber the quantity of heat necessary for the regeneration, without having to raise the gaseous mixture to a too elevated temperature prejudicial to the maintenance of the quality of the adsorbant. But to convert the apparatus from the stage of heating the adsorbant for regeneration to the stage of cooling the latter, it is necessary to operate three valves (9,12 and 14 in FIG. 1) of which the four-way valve is complicated and is less reliable in that it is exposed in simultaneous operation to the very different temperatures of the dried gas product and the hot mixture of regeneration gas.

The invention reduces these disadvantages by an apparatus which, while keeping the advantages of low consumption and low levels of temperature of dry gas for regeneration, only requires, in order to pass from the heating stage to that of cooling, the operation of a single valve, which is also a one-way valve, through which always passes only gas at ambient temperature. The reliability of the apparatus is better, its operation is simplified and, although less complicated and less expensive to manufacture, it permits one to regulate the ratio of humid air to dry gas in the mixture delivered and to take without difficulty the appropriate measures to reduce, if necessary, the dew point of the regeneration mixture.

The apparatus according to the invention comprises an entry and an exit, two adsorbers mounted in parallel between the entrance and the exit by inlet and exit conduits; a jet pump having an inlet, suction means and delivery means; heating means mounted on the delivery means; means which engage selectively only one of the exit conduits in communication with the delivery means; means which put the inlet in communication only with the other of the exit conduits; and a valve mounted on the suction means.

The use of a jet pump permits, since it comprises a static machine, excellent reliability concerning regeneration and the fact that the drive fluid is taken from the jet pump at the exit of the apparatus, that is to say the dry compressed air is used, permits, during the cooling of the adsorbant product, a venturi effect of the dry air quite simply by preventing the admission of ambient air to the jet pump.

By way of example, the invention will be described hereunder with the aid of the accompanying drawing which shows a simplified longitudinal section of an adsorption dryer for a gaseous fluid.

This apparatus for the drying of air comprises two identical adsorbers 1 and 2 which have the form of cylinders of revolution of circular cross section. Each cylinder is closed at its ends by hemispherical caps and is, for example, arranged vertically. The lower openings 3 and 4 are joined by the conduits 7 and 8 to the inlet line for compressed air to be dried. Between each of the openings 3 and 4 and the compressed air inlet, on each of the conduits 7 and 8, there are valves 10 and 11 respectively, the two valves serving to select the adsorber in which the compressed air should be dried. Each one of the conduits 7 and 8 carries a valve 12 or 13 respectively serving to decompress each of the adsorbers as well as a valve 14 or 15 respectively for the disposal of air at the time of regeneration.

The upper openings 5 and 6, protected by grilles 20 and 21 to prevent egress of the adsorbant product contained in each adsorber, are joined by the conduits 16 or 17 respectively to the exit of the apparatus letting out the dry compressed air. Each of these conduits is provided with a non-return valve 18 or 19 respectively preventing travel in the direction opposed to that going towards the exit 33. To avoid egress of adsorbant product through the lower openings 3 and 4, these are protected by grilles 22 and 23 respectively.

From the common point where the conduits 5 and 6 rejoin the exit 33 for dry compressed air, leaves another conduit 24 joined at its extremity to the inlet intended for the drive fluid of a jet pump 25, whereof the aspiration of ambient air is controlled by a valve 26 and of which the pump exit for the mixture of compressed air and ambient air is joined to a conduit 27 which then joins a heating means 28 which is arranged outside the adsorbers 1, 2 and of which the exit is joined on the one hand to conduit 16 by a conduit 29 and on the other hand to conduit 17 by another conduit 30. The conduits 29 and 30 are provided with non-return valves 31 and 32 closing the passage in the direction going from the conduits 16, 17 towards the conduit 27. The non-return valves 18, 19 are interposed between the point where the conduit 24 opens out and that where the conduits 29, 30 respectively open out into the conduits 16, 17.

Operation is as follows. Compressed air enters by the inlet line and emerges in dried form from the exit 33. In the apparatus, as it is represented in the figure, the adsorber 1 functions as the drier for the compressed air and the adsorber 2 as regenerator of the adsorbent product.

In this position, the valve 10 is open and the valve 11 closed, in such a way that the compressed air passes upwards through the adsorbent product contained in the adsorber 1 and emerges dried from the conduit 16. The adsorber 2 is in the course of regeneration. Initially, the depressurisation of the adsorber 2 is effected by opening the valve 13 which has as a consequence the closure of the non-return valves 19 and 31.

Once the depressurisation is terminated, the valve 15 is opened to allow a greater quantity of air to escape during this phase of regeneration and the depressurisation valve 13 is closed.

In a second stage, the valve 26 is opened in such a way that the jet pump 25 aspirates a quantity of ambient air, using the reduction in pressure of the compressed gas. The mixture of air is thus carried into the adsorber 2 as is shown by the arrows in the figures and passes downwardly through the adsorbant product contained therein before being evacuated to the exterior by the valve 15.

In a third stage, and almost immediately, the heating means 28 is brought into operation, so that the regeneration current supplies a quantity of heat sufficient to enable the adsorbant product to give up the water which it has stored.

In a fourth stage, the valve 26 is closed; there then remains only circulation of dry compressed air, and the power of the heating means, so as to regenerate the adsorber 2 with hot perfectly dry air to complete the drying of the adsorbant product contained in the upper part.

In a fifth stage, the heating means 28 are switched off; the compressed air which then circulates in the adsorber 2 is cold and thus ensures the cooling of the adsorbant product.

In a sixth stage, the valve 15 is closed to repressurise the adsorber 2 and once this pressurisation is finished, the valve 11 is opened while the valve 10 is left open, in order to cause the compressed air to be dried to circulate in parallel in the two adsorbers 1 and 2, and thus terminate if necessary the cooling of the adsorbant product contained in the adsorber 2, any warm air thus being optionally mixed with the cold air leaving the adsorber 1.

Finally the valve 10 is closed in order to set the adsorber 1 to regeneration and ensure that the adsorber 2 serves to dry the compressed air entering the apparatus.

The regeneration of the adsorbant product contained in the adsorber 1 is effected in a manner analogous to that previously described for the adsorber 2.

The process remains the same if one reverses the direction of circulation in the vessels containing the desiccant. That is to say, drying in the downward direction and flushing out for regeneration in the upward direction.

The compressed air passing through the conduit 24 represents, in general, from 2 to 6% by volume of the amount leaving by the conduit 5.

I claim:

1. Apparatus for drying gas comprising an entry and an exit, two adsorbers mounted in parallel between the entrance and the exit by inlet and exit conduits; a jet pump having an inlet, suction means and delivery means; heating means mounted on the delivery means; means which put selectively only one of the exit conduits in communication with the delivery means; means which put the inlet in communication only with the other of the exit conduits; and a valve mounted on the suction means.

2. Apparatus according to claim 1 wherein the means for putting the inlet in communication with only one of the exit conduits comprises two non-return valves mounted on the exit conduits so as to prevent all passage in the direction from the inlet towards the exit conduit.

3. Apparatus according to claim 2 wherein the two said means for putting the inlet in communication comprise, as means for obstruction of flow, only non-return valves.

4. Apparatus according to claim 1 wherein the means for putting only one of the exit conduits selectively in communication with the delivery means comprises two non-return valves mounted on the conduits for putting the delivery means in communication with the exit conduits in such a way as to prevent all passage in the direction from the exit conduits towards the delivery means.

5. Apparatus according to claim 4, wherein the two said means for putting the inlet in communication comprise, as means for obstruction of flow, only non-return valves.

* * * * *